J. JOKISCH.
VEHICLE WHEEL.
APPLICATION FILED OCT. 4, 1920.

1,371,030.

Patented Mar. 8, 1921.
2 SHEETS—SHEET 1.

Inventor
John Jokisch

By
Attorneys

J. JOKISCH.
VEHICLE WHEEL.
APPLICATION FILED OCT. 4, 1920.

1,371,030.

Patented Mar. 8, 1921.
2 SHEETS—SHEET 2.

Inventor
John Jokisch

By
Attorneys

UNITED STATES PATENT OFFICE.

JOHN JOKISCH, OF DETROIT, MICHIGAN.

VEHICLE-WHEEL.

1,371,030.  Specification of Letters Patent.  Patented Mar. 8, 1921.

Application filed October 4, 1920. Serial No. 414,422.

*To all whom it may concern:*

Be it known that I, JOHN JOKISCH, a citizen of the United States of America, residing at Detroit, in the county of Wayne and State of Michigan, have invented certain new and useful Improvements in Vehicle-Wheels, of which the following is a specification, reference being had therein to the accompanying drawings.

The primary object of my invention is to provide a resilient wheel with a yieldable periphery or tread which will afford a cushion for the body of the wheel during its use, and within the body of the wheel are novel means for resisting the yieldableness of the periphery or tread, with said means constructed so that it may be adjusted for various loads, thus permitting of the wheel being used for light and heavy vehicles to provide a desired degree of yieldableness between the road and the body of the vehicle.

Another object of my invention is to provide a wheel having novel tire supporting or suspending members which will obviate the necessity of using a pneumatic tire, inflated members, spring spokes, and devices heretofore tried out or used.

A further object of this invention is to provide a resilient wheel with radiating tread members constantly maintained distended by axially disposed means within the body or hub portion of the wheel, said means resisting compression of the tread members without interfering with the turning of the wheel about its axis.

A still further object of this invention is to accomplish the above results by a durable construction that will be hereinafter specifically described and then claimed, and reference will now be had to the drawings, wherein—

Figure 1:
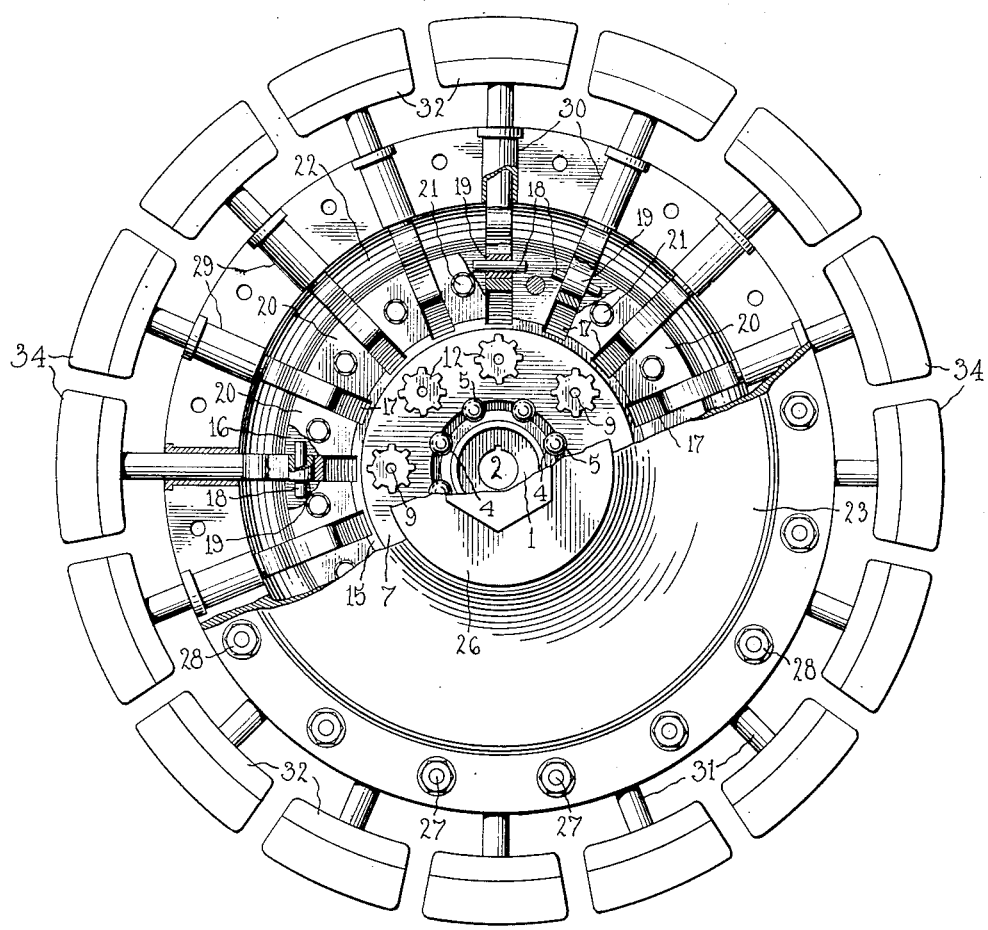
Figure 1 is a side elevation of the wheel partly broken away and partly in section.

In the drawing the reference numeral 1 denotes a hub having an opening 2 adapted to receive the spindle or end of an axle (not shown). On the inner end of the hub 1 is a peripheral flange 3 and extending from this flange to the outer end of the hub are a plurality of equally spaced grooves or ball races 4 to receive anti-frictional bearings 5, preferaby in the form of balls within cages. The ball cages are supported by the edges of a reciprocable sleeve 6 which normally abuts the flange 3 and has its outer edge provided with a peripheral flange 7. In the flange 7 are a plurality of rotatable nuts 8 for the screw threaded ends 9 of coiled retractile springs 10, said springs having the inner convolutions thereof anchored in the flange 3, as at 11, and the retractile force of these springs is adapted to resist an outward movement of the sleeve 6 on the hub 1.

The outer ends of the rotatable nuts 8 terminate in pinions or small gear wheels 12 and adapted to be placed in engagement with these pinions or small gear wheels is a large gear wheel 13 forming part of a cap wrench 14 which may be placed over the end of the hub 1 and rotated to simultaneously rotate all of the nuts 8 and increase or decrease the tension of the springs 10 by the screw-threaded ends 9 thereof moving in the nuts 8.

Mounted between the flanges 3 and 7 and surrounding all of the springs 10 is a casing 15 which coöperates with said flanges and the sleeve 6 in providing an inclosure or casing for said springs, the casing being reciprocable on the hub 1 to and from the flange 3 thereof.

On the casing 15 is a peripheral flange 16 provided with a plurality of radial slots 17. Extending transversely of the slots 17 are roller pins 18 provided with anti-frictional rollers 19 within the slots 17, said pins being partly set in the flange 16 and retained in engagement therewith by plates or blocks 20 secured by screw bolts 21 or other fastening means mounted in the flange 16.

The body of the wheel is formed by an inner disk 22 and an outer disk 23, said disks being pressed to provide a housing about the casing 15 on the hub 1. The inner disk 22 is mounted on the inner end of the hub 1, and suitably secured to said disk is a brake drum 24. The outer disk 23 has a concentric opening 25 normally closed by a detachable cap 26, said cap permitting of access being had to the outer end of the hub 1, so that the wrench 14 may be used and the hub 1 mounted on an axle spindle.

The peripheral edges of the disks 22 and 23 are connected by equally spaced bolts 27 and nuts 28 and the peripheral edges are pressed and shaped to afford radially disposed sockets 29 for bushings 30 which are clamped between said disks. Slidable in the bushings 30 are short spokes or stems 31 of tread members 32, said tread members being detachably connected to the spokes or stems, as at 33, and provided with resilient tread pieces or cushion members 34. The inner ends of the spokes or stems 31 have angularly disposed slotted heads 35 extending into the slots 17 with the antifrictional rollers 19 in the slots of the heads 35, so that inward movement of the tread members 32 will cause the casing 15 to shift outwardly, relative to the flange 3, against the retractile force of the springs 10, and it is these springs that cushion the body of the wheel when supporting a load.

Figure 4:
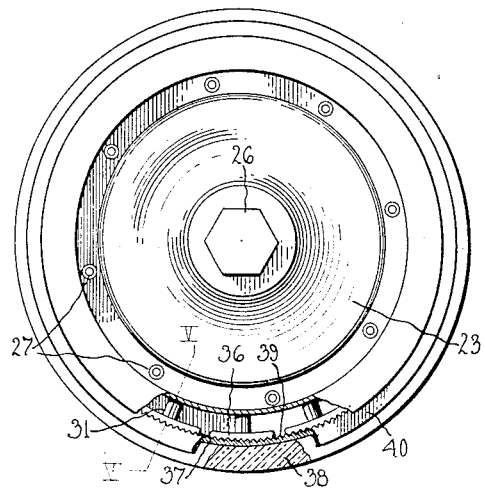
Fig. 4 is a side elevation, on a small scale, of a modified form of wheel, partly broken away and partly in section.
Figure 2:
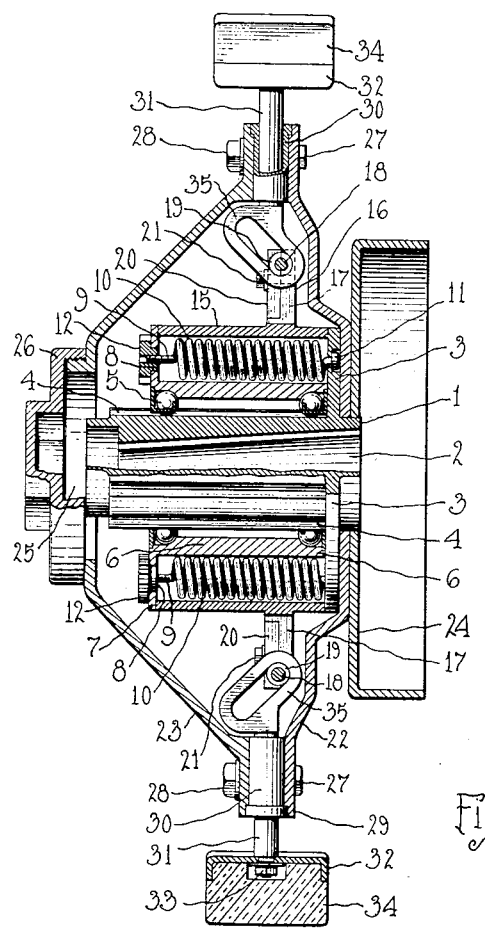
Fig. 2 is a transverse sectional view of the wheel partly in elevation.
Figure 3:
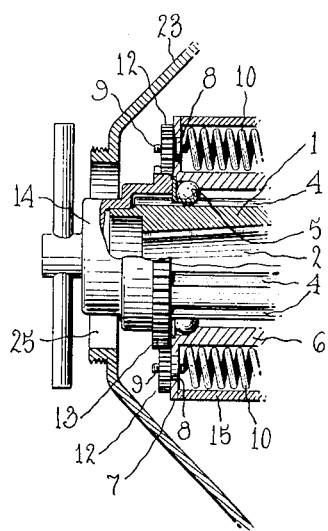
Fig. 3 is a detail sectional view of a portion of the wheel, showing a wrench adapted for adjusting the tension means of the wheel.
Figure 5:
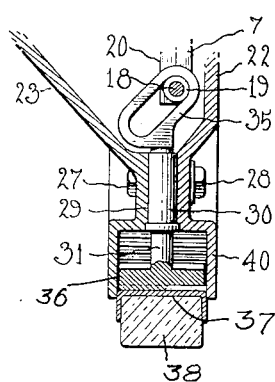
Fig. 5 is an enlarged cross sectional view of the same taken on the line V—V of Fig. 4.

As illustrated in Figs. 4 and 5 the tread members may take the form of gripping heads 36 to frictionally engage a rim 37 supporting a tire 38. The inner wall of the rim 37 may be toothed or roughened, as at 39, so that the gripping heads 36 may hold the rim 37 for movement with the body of the wheel, and the rim is supported by side plates 40 formed integral with the disks 22 and 23 forming the body of the wheel. Assuming that the wheel supports a load the lowermost gripping heads 36 will remain in engagement with the rim 37 while other gripping heads are retracted, relative to the rim, due to the load supported by the body of the wheel. In the preferred form of construction all of the tread members are simultaneously retracted and this is also true in the modified form of construction, but the rim 37 and its tire 38 remain intact and dirt, dust and other foreign matter are excluded by the side plates extending on to the rim or tire of the wheel.

In the preferred form of construction the tread members have the action of individual ground grippers, for instance, as found in connection with caterpillar tractors, and the wheel may be so used for heavy vehicles or provided with the rim and tire for light vehicles. In either instance the tension means within the body of the vehicle may be regulated for such use or it may be regulated to compensate for jars and shocks that would otherwise be imparted to a vehicle body when encountering rough and irregular roads.

While in the drawings there are illustrated the preferred embodiments of my invention, it is to be understood that the structural elements are susceptible to such variations and modifications as fall within the scope of the appended claims.

What I claim is:—

1. In a resilient vehicle wheel, a hub, a reciprocable casing on said hub, means in said casing to resist reciprocation of said casing, a wheel body inclosing said casing, spokes slidable in said wheel body, tread members on the outer ends of said spokes, and means articulating said spokes and said casing so that inward movement of said spokes is resisted by said casing.

2. A vehicle wheel as in claim 1, characterized by the first mentioned means including springs connecting said hub and casing.

3. A vehicle wheel as in claim 1, characterized by the last mentioned means including anti-frictional rollers supported by said casing, and heads on said spokes engaged by said rollers.

4. In a vehicle wheel, a hub, a casing reciprocable thereon, radially shiftable tread members about said casing, means in said casing to resist shifting of said tread members, and means supporting said tread members relative to said hub and casing.

5. A vehicle wheel as in claim 4, characterized by said resisting means including springs disposed longitudinally about said hub and adapted to have the tension thereof regulated at the outer end of said hub.

6. A vehicle wheel as in claim 4 characterized by said resisting means including springs attached to said hub, and rotatable nuts carried by said casing and adapted to be simultaneously rotated to increase or decrease the tension of said springs.

7. In a vehicle wheel, a hub, a wheel body on said hub, shiftable spokes extending into said wheel body, tread members on the outer ends of said spokes, a rim about said tread members, and means shiftable longitudinally of said hub adapted to resist inward movement of said spokes, said means including a spring held casing on said hub, slotted heads on said spokes, and anti-frictional rollers carried by said casing and engaging in said spoke heads.

In testimony whereof I affix my signature in presence of two witnesses.

JOHN JOKISCH.

Witnesses:
ANNA M. DORR,
KARL H. BUTLER.